(12) United States Patent
Blaser

(10) Patent No.: US 10,236,731 B2
(45) Date of Patent: Mar. 19, 2019

(54) WET ELECTRIC MOTOR AND PUMPING SET

(75) Inventor: Georg Blaser, Asperg (DE)

(73) Assignee: Grundfos Holding a/s, Bjerringbro (DK)

( * ) Notice: Subject to any disclaimer, the term of this patent is extended or adjusted under 35 U.S.C. 154(b) by 699 days.

(21) Appl. No.: 13/884,754

(22) PCT Filed: Nov. 2, 2011

(86) PCT No.: PCT/EP2011/069262
§ 371 (c)(1),
(2), (4) Date: Aug. 26, 2013

(87) PCT Pub. No.: WO2012/062638
PCT Pub. Date: May 18, 2012

(65) Prior Publication Data
US 2013/0328459 A1    Dec. 12, 2013

(30) Foreign Application Priority Data

Nov. 11, 2010  (DE) .................. 10 2010 051 916
Nov. 11, 2010  (DE) .................. 10 2010 051 918
Mar. 15, 2011  (EP) ..................... 11002127

(51) Int. Cl.
*F04D 13/06* (2006.01)
*H02K 5/128* (2006.01)
(Continued)

(52) U.S. Cl.
CPC ............ *H02K 1/146* (2013.01); *F04B 49/06* (2013.01); *F04D 13/06* (2013.01); *F04D 13/064* (2013.01);
(Continued)

(58) Field of Classification Search
CPC .......... H02K 1/146; H02K 3/28; H02K 9/197; H02K 1/2753; H02K 5/22; H02K 5/128;
(Continued)

(56) References Cited

U.S. PATENT DOCUMENTS 2,811,107 A    10/1957  Brill
3,814,963 A *   6/1974  Laing ................. H02K 1/12
                                             310/166
(Continued)

FOREIGN PATENT DOCUMENTS

DE    2242653 A1     3/1973
DE    2262867 A1 *   7/1974  ............... H02K 1/12
(Continued)

OTHER PUBLICATIONS

JP10002294A (English Abstract).*
(Continued)

*Primary Examiner* — Thomas Truong
*Assistant Examiner* — Alexander Moraza
(74) *Attorney, Agent, or Firm* — Panitch Schwarze Belisario & Nadel LLP

(57) ABSTRACT

A wet electric motor for a pump includes a stator casing, a stator arranged in the stator casing, and a can, wherein first resilient pressure elements are arranged inside the stator casing in such a way as to exert a compressive force in the direction of the can on at least parts of the stator, as well as to a pumping set with such a wet electric motor.

14 Claims, 4 Drawing Sheets

(51) Int. Cl.

| | |
|---|---|
| *H02K 1/18* | (2006.01) |
| *H02K 1/14* | (2006.01) |
| *F04D 15/02* | (2006.01) |
| *F04D 29/046* | (2006.01) |
| *H02K 21/16* | (2006.01) |
| *H02K 21/24* | (2006.01) |
| *G05D 9/12* | (2006.01) |
| *H02P 6/182* | (2016.01) |
| *F04B 49/06* | (2006.01) |
| *H02K 1/27* | (2006.01) |
| *H02K 3/28* | (2006.01) |
| *H02K 9/197* | (2006.01) |
| *H02K 11/33* | (2016.01) |
| *H02K 5/10* | (2006.01) |
| *H02K 5/173* | (2006.01) |
| *H02K 5/22* | (2006.01) |
| *H02K 5/24* | (2006.01) |

(52) U.S. Cl.
CPC ..... *F04D 13/0606* (2013.01); *F04D 15/0218* (2013.01); *F04D 29/0467* (2013.01); *G05D 9/12* (2013.01); *H02K 1/148* (2013.01); *H02K 1/2753* (2013.01); *H02K 3/28* (2013.01); *H02K 5/128* (2013.01); *H02K 5/22* (2013.01); *H02K 9/197* (2013.01); *H02K 11/33* (2016.01); *H02K 21/16* (2013.01); *H02K 21/24* (2013.01); *H02P 6/182* (2013.01); *H02K 1/182* (2013.01); *H02K 5/10* (2013.01); *H02K 5/1282* (2013.01); *H02K 5/1737* (2013.01); *H02K 5/225* (2013.01); *H02K 5/24* (2013.01)

(58) Field of Classification Search
CPC .... H02K 21/24; H02K 1/148; H02K 11/0073; H02K 5/225; H02K 5/24; H02K 5/1737; H02K 5/1282; H02K 1/182; H02K 5/10; H02K 11/33; H02K 21/16; H02K 5/1285; H02K 2005/1287; H02K 5/02; H02K 5/04; H02K 5/08; H02K 5/12; F04B 49/06; H02P 6/182; G05D 9/12; F04D 13/06; F04D 13/064; F04D 15/0218; F04D 29/0467; F04D 13/0606; F04D 13/0613; F04D 13/0626; F04D 13/062
USPC ......... 310/68 R, 85–89, 91, 272, 257, 254.1, 310/216.124, 423, 431, 263, 71; 417/357, 417/420
See application file for complete search history.

(56) References Cited

U.S. PATENT DOCUMENTS

| | | | |
|---|---|---|---|
| 4,043,706 A | 8/1977 | Walker | |
| 4,051,401 A | 9/1977 | Hayward | |
| 4,087,708 A * | 5/1978 | Laing | H02K 1/182 310/64 |
| 4,352,646 A | 10/1982 | Laing et al. | |
| 4,471,253 A | 9/1984 | Laing | |
| 4,620,120 A * | 10/1986 | Laing | H02K 1/12 310/166 |
| 4,728,268 A * | 3/1988 | Laing | F04D 13/06 417/420 |
| 5,552,653 A | 9/1996 | Nose | |
| 6,365,998 B1 * | 4/2002 | Kech | H02K 3/47 310/194 |
| 7,015,603 B2 | 3/2006 | Barrho et al. | |
| 7,855,486 B2 | 12/2010 | Hasegawa | |
| 2002/0098089 A1 | 7/2002 | Forsberg | |
| 2005/0225192 A1 | 10/2005 | Kloepzig et al. | |
| 2007/0096583 A1 * | 5/2007 | Welke | H02K 3/325 310/214 |
| 2008/0007126 A1 | 1/2008 | Popov et al. | |
| 2009/0146524 A1 * | 6/2009 | Laing | H02K 3/522 310/208 |
| 2010/0090635 A1 * | 4/2010 | Andersen | F04D 29/426 318/490 |
| 2010/0111729 A1 | 5/2010 | Andersen et al. | |
| 2010/0283344 A1 * | 11/2010 | Horng | F04D 29/059 310/90 |
| 2011/0232109 A1 * | 9/2011 | Strader | A01D 34/733 30/347 |
| 2011/0241454 A1 | 10/2011 | Staehr | |
| 2012/0227831 A1 * | 9/2012 | Kozuschek | F16K 15/20 137/231 |
| 2012/0261325 A1 * | 10/2012 | Brown | B01D 35/306 210/236 |

FOREIGN PATENT DOCUMENTS

| | | | | |
|---|---|---|---|---|
| DE | 3436510 A1 * | 4/1986 | ............... | H02K 1/16 |
| DE | 4225148 A1 | 2/1994 | | |
| DE | 19646617 A1 | 5/1998 | | |
| DE | 102004017507 A1 | 10/2005 | | |
| DE | 102004027744 A1 | 12/2005 | | |
| DE | 102006026719 A1 | 12/2007 | | |
| DE | 102007042186 A1 | 3/2009 | | |
| DE | 202007018771 U1 | 3/2009 | | |
| DE | 102009048889 A1 | 5/2010 | | |
| EP | 0688088 A1 | 12/1995 | | |
| EP | 1063751 A1 | 12/2000 | | |
| EP | 1203886 A2 | 5/2002 | | |
| EP | 1947343 A1 | 7/2008 | | |
| EP | 1947753 A1 | 7/2008 | | |
| EP | 2040350 A2 | 3/2009 | | |
| JP | 10002294 A * | 1/1998 | | |
| JP | 2003-018797 A | 1/2003 | | |
| WO | 9305564 A1 | 3/1993 | | |
| WO | 19617083 A1 | 10/1997 | | |
| WO | 9835424 A1 | 8/1998 | | |
| WO | 03103114 A1 | 12/2003 | | |
| WO | 2008019818 A1 | 2/2008 | | |
| WO | 2008135103 A1 | 11/2008 | | |
| WO | 2008150334 A1 | 12/2008 | | |
| WO | 2009006927 A1 | 1/2009 | | |
| WO | 2009012883 A2 | 1/2009 | | |
| WO | 2010031468 A1 | 3/2010 | | |

OTHER PUBLICATIONS

DE2262867A1 (English Translation).*
DE3436510A1 (English Translation).*
DE 2262867 A1 (English Human Translation).*
DE 3436510 A1 (English Human Translation, provided by STIC).*
Int'l Search Report and Written Opinion dated Mar. 5, 2013 in Int'l Application No. PCT/EP2011/069261.
Int'l Search Report and Written Opinion dated Feb. 20, 2013 in Int'l Application No. PCT/EP2011/069260.
Int'l Search Report and Written Opinion dated Mar. 8, 2013 in Int'l Application No. PCT/EP2011/069340.
Int'l Search Report dated Mar. 15, 2013 in Int'l Application No. PCT/EP2011/069264.
Int'l Search Report dated Mar. 1, 2013 in Int'l Application No. PCT/EP2011/069262.
Office Action dated Apr. 1, 2011 in DE Application No. 10 2010 051 916.2.
Office Action dated Nov. 28, 2011 in DE Application No. 10 2010 051 918.9.

* cited by examiner

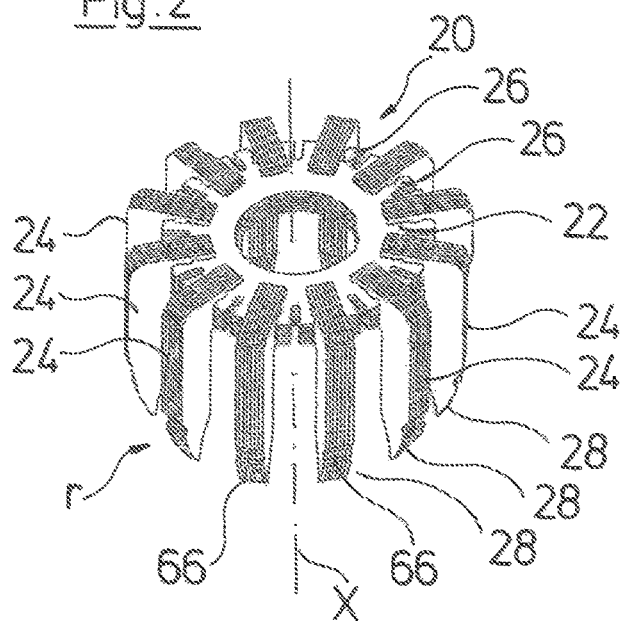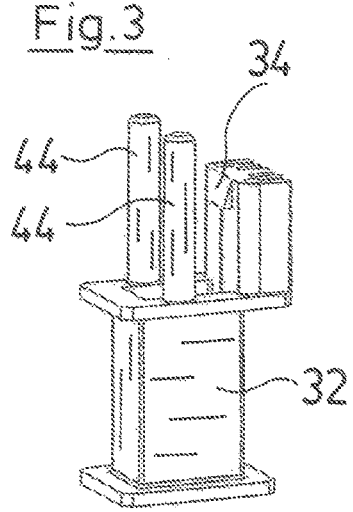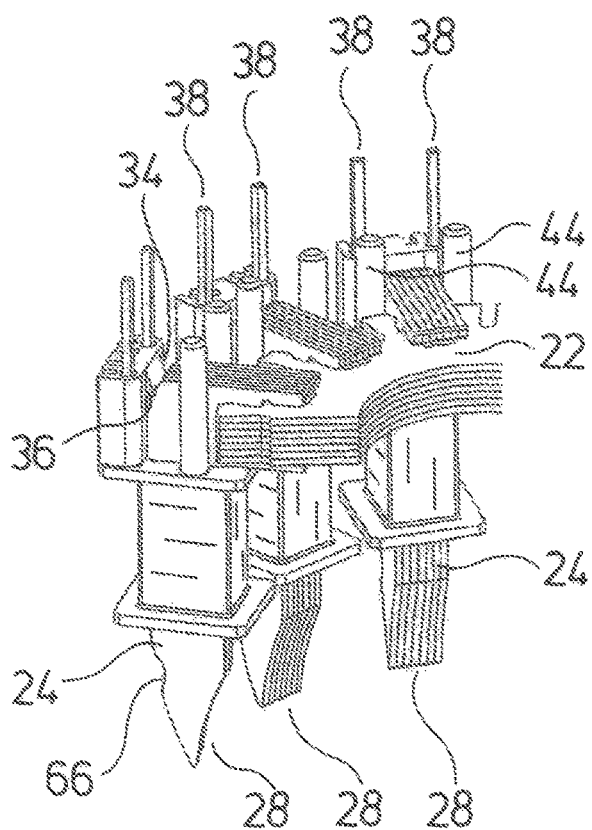

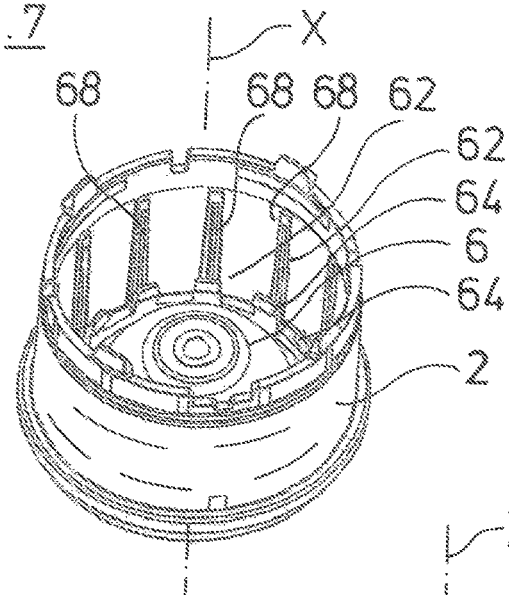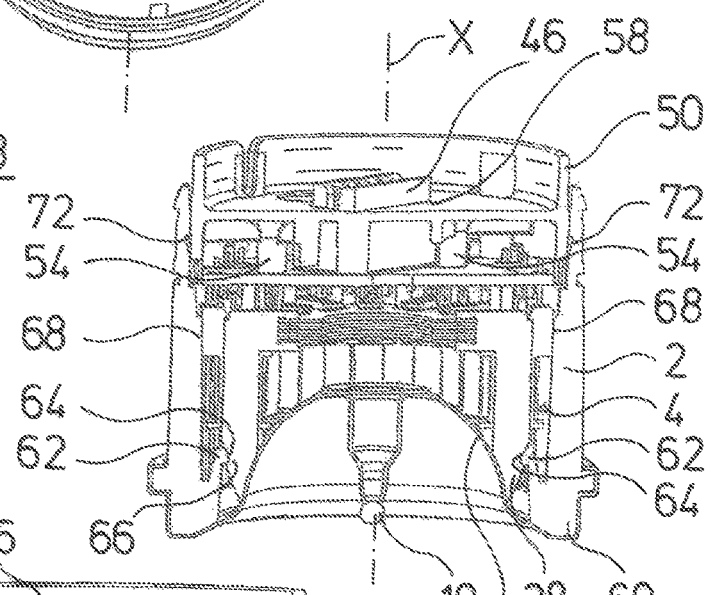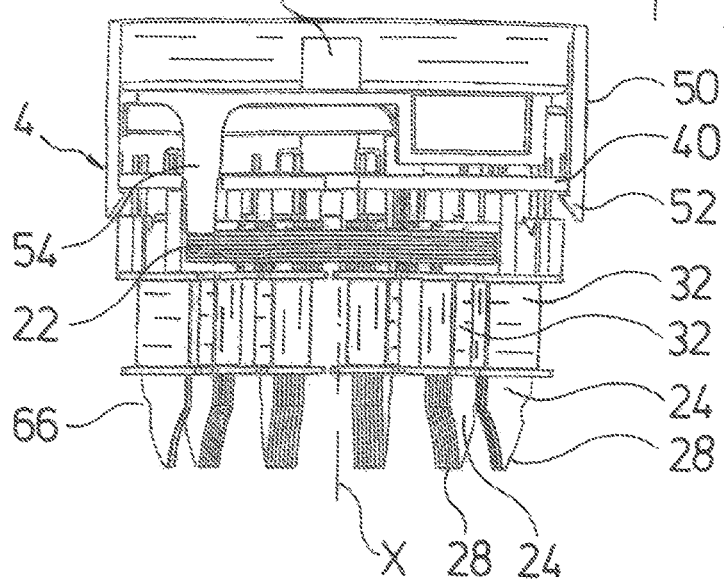

WET ELECTRIC MOTOR AND PUMPING SET

CROSS-REFERENCE TO RELATED APPLICATIONS

This application is a Section 371 of International Application No. PCT/EP2011/069262, filed Nov. 2, 2011, which was published in the German language on May 18, 2012, under International Publication No. WO 2012/062638 A3 and the disclosure of which is incorporated herein by reference.

BACKGROUND OF THE INVENTION

Embodiments of the invention relate to a wet electric motor for a pump with a stator casing, a stator arranged in the stator casing, and a can or a separating calotte.

Such wet electric motors are used in particular in recirculation pumps, for example in heating or industrial water recirculation pumps. In the latter, the rotor runs inside the can or separating calotte in the liquid to be conveyed.

The stator generally consists of iron parts and coils that are allocated to the iron parts, and is situated between the stator casing and the can. It is here essential that the stator be placed as precisely as possible in relation to the can and near to the can, so as to generate the strongest possible magnetic field acting on the rotor.

It is desirable to improve a wet electric motor in such a way that the stator can be easily placed near to the can in a precise manner.

BRIEF SUMMARY OF THE INVENTION

According to embodiments of the invention, the wet electric motor provided for use in a pump exhibits a stator casing that incorporates a stator, wherein the stator envelops a can arranged inside the stator. In terms of the invention, a can is to be understood as any form of separating element that divides the rotor chamber from the stator chamber, so that the rotor can run in the liquid to be conveyed. For example, such a separating element can also be a separating calotte, which finds application in a spherical motor, or a divider. The rotor is placed inside the can. The stator can include stator sheets with electrical coils arranged thereon. In order to be able to place the stator precisely inside the stator casing and near the can, embodiments of the invention provide that first resilient pressure elements be situated inside the stator casing. These resilient pressure elements are here arranged inside the stator casing in such a way as to exert a compressive force in the direction of the can on at least parts of the stator, in particular the parts of the stator lying in the circumferential area of the can. In this way, these stator parts can be pressed in the direction of the stator by the pressure elements. The resilient pressure elements preferably hold the parts of the stator without play inside the stator casing on the one hand, and press them close to the can, in particular so as to abut against the can, on the other. In this way, rattling noises caused by movable parts inside the stator casing can be avoided, and the stator poles can additionally be moved as close to the can as possible, so as to in this way place them as close to the rotor as possible, and optimize the magnetic efficiency in tandem with the rotor. The resilient pressure elements here enable a simple assembly, and are able to offset a certain play or certain tolerances between the stator, stator casing and can, and ensure that the stator becomes fixed inside the stator casing without play and rattling. This makes it possible to do without any casting of the stator casing with the stator arranged thereon.

The stator preferably exhibits a plurality of pole webs extending axially and parallel to a rotational axis of the electric motor. The first pressure elements are here then situated in such a way as to exert a compressive force on the pole webs. In this way, the pole webs can be pressed in the direction of the can, i.e., toward the can, so as to be placed as close to the can as possible, ideally abutting directly against it. The pole webs can here deform to a certain extent, for example. It is especially preferred that a first pressure element be present for each pole web. In other words, each pole web is exposed to a compressive force toward the can by its own pressure element. For example, twelve pressure elements are arranged or formed inside the stator casing given a twelve-pole stator.

It makes sense for the pole webs to be movable in at least one direction, preferably in a radial direction. This allows the pole webs to be moved by the pressure elements toward the can, so that they are moved into a desired end position by the pressure elements, and held in this end position by the resilience of the pressure elements. In other words, the spring effect by the pressure elements exerts a constant compressive force on the pole webs, so that the latter are held pressed toward the can. As a result, the movable pole webs can be fixed in place free of play, without having to pour out the stator casing with a casting compound.

In a preferred embodiment of the invention, the first pressure elements generate a radially directed compressive force. This is preferred in cases involving a can that is tubular or semispherical, i.e., takes the form of a separating calotte, and the pole webs circumferentially envelop this can. Such a radially directed compressive force makes it possible to press the pole webs in a radial direction toward the outer wall of the can. For example, in a case where the can should be disk-shaped, and the rotor and stator lie axially opposite each other, it would also be conceivable to exert an axial compressive force on the stator poles or pole webs, however. Even when using a can taking the form of a separating calotte in a spherical motor, a compressive force could be exerted at least partially in an axial direction so as to press or move the stator poles or pole webs toward the outer wall of the can or the separating calotte.

It is especially preferred for the first pressure elements to be designed as flexible tongues, which are also preferably fabricated as a single piece with the stator casing. In particular if the stator casing is fabricated out of plastic as an injection molded part, it here becomes easily possible to injection mold the pressure elements as flexible tongues together with the stator casing. This yields a simple manufacturing process.

The flexible tongues here preferably protrude from the inside of the stator casing, i.e., its interior circumferential surface, at an inclination relative to the rotational axis or longitudinal axis of the stator or stator casing. The flexible tongues are here hinged to the interior wall of the stator casing with one longitudinal end, while their opposing longitudinal end is spaced apart from the interior wall of the stator casing, so that they can be moved radially outward in this area, thereby generating a radially inwardly directed resilient restoring force. The flexible tongues are here configured in such a way that, when at rest, the diameter encompassed by the flexible tongues circumferentially distributed inside the stator casing is smaller than the outer diameter of the stator to be inserted. As a result, the stator to be inserted presses the flexible tongues to the outside to a certain extent, causing the latter to generate a resilient restoring force, which forces the stator or its pole webs radially inward. The movement of the pole webs is then preferably limited by abutment against the outer circumference of the can. The flexible tongues are preferably arranged in such a way that the end of the flexible tongue that comes into contact with the stator first during insertion of the stator is the end of the flexible tongues that is spaced apart from the interior wall of the stator casing. In other words, when the stator is being inserted into the stator casing from the side facing away from a pump housing to be positioned, the axial end of the flexible tongues facing the pump housing is hinged to the interior wall of the stator casing. The stator casing can here be designed in such a way that its one axial end can be joined in a known manner with a pump housing, in which an impeller of a pump rotates. The pump impeller is secured in a torque-proof manner with the rotor of the electric motor, or configured integrally with the rotor.

It is further preferred that the first pressure elements be designed as latching elements, which engage corresponding latching elements on the stator or its pole webs. In addition to the non-positive fixation of the stator, a positive fixation of the stator inside the stator casing is achieved in this way. In particular, the latching elements preferably engage into corresponding latching elements of the stator in such a way as to secure the stator in an axial direction inside the stator casing.

In another preferred embodiment, the stator exhibits a plurality of pole webs, on which a respective electrical coil is placed, wherein it is further preferred that the coils each exhibit a coil carrier, which is non-positively and/or positively joined with the pole webs. As a consequence, the coils are preferably fixed in place on the pole webs by latching or clamping elements. For example, the pole webs can be provided with a recess in which the coil carriers engage with a latching projection, so as to fix the coil carriers, and hence the coils, on the pole webs in an axial direction. During assembly, the coils are to this end slipped onto the pole webs together with the coil carriers, preferably from the free end. At the end facing away from the free end, the pole webs can be connected by magnetic return elements, so as to enable a magnetic flux between individual pole webs.

The individual stator poles or stator pole webs are preferably uniformly distributed over the circumference of the can. For example, twelve pole webs can be provided given a configuration as a three-phase motor. Eight pole webs can be provided for a two-phase motor, for example.

In another preferred embodiment, the stator casing incorporates second pressure elements, against which the respective radially exterior side of the coils or their coil carriers abuts. The second pressure elements can be rigid or also be resilient in design. The second pressure elements preferably cause the coils or their coil carriers to abut against the radially exterior side of the pole webs, so that the second pressure elements can prevent a relative motion between the coils and coil carriers on the one side and the pole web on the other side during operation. In this way, rattling noises are prevented, and the coils and coil carriers are kept abutted against the surface of the pole webs. Casting or adhesive bonding is thus not required. In addition, the coil carriers can be provided with sufficient play, allowing them to easily be placed on the pole webs.

The second pressure elements are preferably designed as webs that project radially inward and extend axially along the inner wall of the stator casing. As a result of these webs, the coils or coil carriers can be pressed or made to abut over a larger axial length. The radial interior side of the webs can here extend parallel to the longitudinal or rotational axis of the stator, or be conically bent relative thereto, so that the cross sectional surface clamped on by the radially inner surfaces diminishes in the direction in which the stator is inserted. This enables an easy insertion of the stator, and yields a fixation of all stator elements free of play in the final position.

In addition, the stator preferably exhibits a circuit board, which electrically contacts the coils of the stator, and preferably also carries electronic components that comprise the engine electronics. For example, the engine electronics can be designed to set or control the speed of the electric motor, and exhibit a frequency inverter for this purpose. According to the invention, parts of the frequency inverter can here be placed on the circuit board, which is arranged on the stator. This circuit board is then preferably situated inside the stator casing along with the stator. The stator casing is preferably tubular in design, and sealed at an axial end by the adjoining pump housing of the pump and/or by the inserted can. The stator casing is preferably sealed at the opposite axial end by a cover or attached terminal box. Such a terminal box can also accommodate other electrical or electronic components, control and/or display elements and connection elements.

The circuit board, which is arranged on the stator or comprises part of the stator, serves to electrically connect the coils, i.e., it establishes the connection between the coils and motor controller. In addition, the coils are preferably wired together as required on this circuit board. As a result, individual coils can be parallel or series connected, so as to be supplied with current at the same time. For example, if twelve stator poles with twelve coils are provided for a three-phase motor, four coils are always simultaneously provided with current, wherein these coils are preferably configured as two coil pairs lying diametrically opposite each other on the can. The four coils being supplied with current at the same time are preferably electrically connected in series.

In order to fix the circuit board in place, it is further preferred that it abut against contact elements, which are formed on the coil carriers. For example, the contact elements can extend from the coil carriers in an axial direction as contact pins, wherein the circuit board comes to abut against a surface at the ends of these contact elements or contact pins. At the same time, electrical terminal pins or terminal contacts can be provided on the coil carriers, which engage into openings on the circuit board to establish an electrical connection with the circuit board. They can there electrically contact the conductors on the circuit board, wherein they can be soldered with the conductors or conductor paths on the circuit board. As an alternative, plug contacts can here be formed. The advantage to the arrangement of contact surfaces is that the arising forces need not be absorbed by the electrical terminal contacts or terminal pins of the coil when plugging the circuit board on the coil carrier, but rather are conveyed from the circuit board by way of the contact elements directly to the coil carrier. In addition, the defined layout for the circuit board is created in this way.

As described above, the stator casing is preferably sealed with a cover. In a preferred embodiment, the cover is here non-positively and/or positively connected with the circuit board. The advantage to this is that the cover can be joined with the circuit board, and hence the stator, before the stator is inserted into the stator casing, and then inserted into the stator casing together with the stator, and once the stator has been completely inserted into the stator casing, can seal the stator casing on its axial side. This enables a very simple assembly. Further, all components of the stator are also joined with the cover, so that all components are fixedly secured to each other, and unable to cause any rattling noises during operation. The cover preferably exhibits a passage for an electrical connection element. This electrical connection element is used for connection with an electrical connection line or electronic or electrical components arranged inside a terminal box or electronics housing joined with the stator casing. For example, these can be control, operating and/or display elements, or components used to supply power to the electric motor. The electrical connection element for connecting the circuit board inside the stator with outside electrical components is here preferably designed as a plug-in element, thereby enabling simple assembly by snapping together.

In another preferred embodiment, the cover is joined with the circuit board via latching elements. This permits a very easy assembly without a tool. In addition, it is further preferred that the cover be joined with the stator casing by way of latching elements. In this way, the cover is fixed in place not just on the stator, i.e., the circuit board, but at the same time in the stator casing as well. As a consequence, the cover indirectly also serves to fix the circuit board and stator in place inside the stator casing. In this way, all components are rigidly secured to each other, and rattling noises are avoided during operation.

The cover preferably exhibits at least one projection that extends axially, i.e., parallel to the longitudinal or rotational axis of the electric motor, which reaches through a recess in the circuit board and abuts against an iron part of the stator. As a result, when pressing the cover onto the circuit board so as to latch it in place, no excessive force is exerted on the circuit board and the electrical or electronic components arranged on the latter. Instead, axial forces are conveyed directly from the cover to the iron structure of the stator. This also becomes important in particular when the entire stator with the cover joined with the circuit board beforehand is inserted and pressed into the stator casing. It is precisely then that a force is transferred from the cover directly to the structure of the stator without the circuit board lying in the flux. The circuit board is preferably only latched with the cover in the area of its outer circumference. For example, the projection can take the form of a pin, extend through a hole in the circuit board, and abut against one of the pole legs or a return element of the stator.

In another preferred embodiment of the invention, the stator casing is enveloped by a cladding element, which is joined with the stator casing by latching elements. Such a cladding element is preferably also made out of plastic. Such a cladding element can be used to provide thermal insulation to the outside. In particular when the axial end of the can is bent radially outward and there joined with the circumferential region of an axial face of the tubular stator casing, it is advantageous for this circumferential region, in which the can is joined with the stator casing, to be covered by a cladding element. This is because contact with the can, and hence a danger of burning, can be prevented in this way. When the liquid to be conveyed is flowing through the inside of the can, for example when hot water is being conveyed, it is possible for the can to become very hot. A retainer nut can be used to screw the stator casing to a pump housing, and can further be fixed in place on the stator casing in an axial direction by the cladding element.

Aside from the wet electric motor described above, embodiments of the invention also relate to a pumping set, which exhibits such a wet electric motor as the drive motor. This pumping set involves in particular a recirculation pumping set, for example a heating recirculation pumping set or an industrial water recirculation pumping set. As described above, the stator casing in this pumping set can be joined at an axial end with a pump housing. For example, this can be accomplished with a retainer nut, which overlaps a radial collar of the stator casing, wherein the retainer nut is then screwed with a thread on the pump housing. An impeller runs in the pump housing, and is secured to the rotor of the electric motor in a torque-proof manner, or designed as a component integrated with the rotor. The axial end of the can comes to tightly abut against the pump housing, wherein a gasket can be arranged between the two components. As described above, the can for this purpose best exhibits a radial collar, which establishes the connection to the stator casing, and simultaneously acts as a contact surface on the gasket on the pump housing.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2 is a perspective view of the iron parts comprising the stator of the electric motor according to FIG. 1;

FIG. 3 is a detailed view of a coil carrier;

FIG. 4 is a section of the stator, which depicts how the coil carrier is secured to the iron parts of the stator;

FIG. 7 is a perspective view of the stator casing;

FIG. 8 is a sectional view of the stator casing with the stator inserted, and

FIG. 9 is a sectional view of the stator with assembled cover according to FIG. 6.

DETAILED DESCRIPTION OF THE INVENTION

Figure 1:
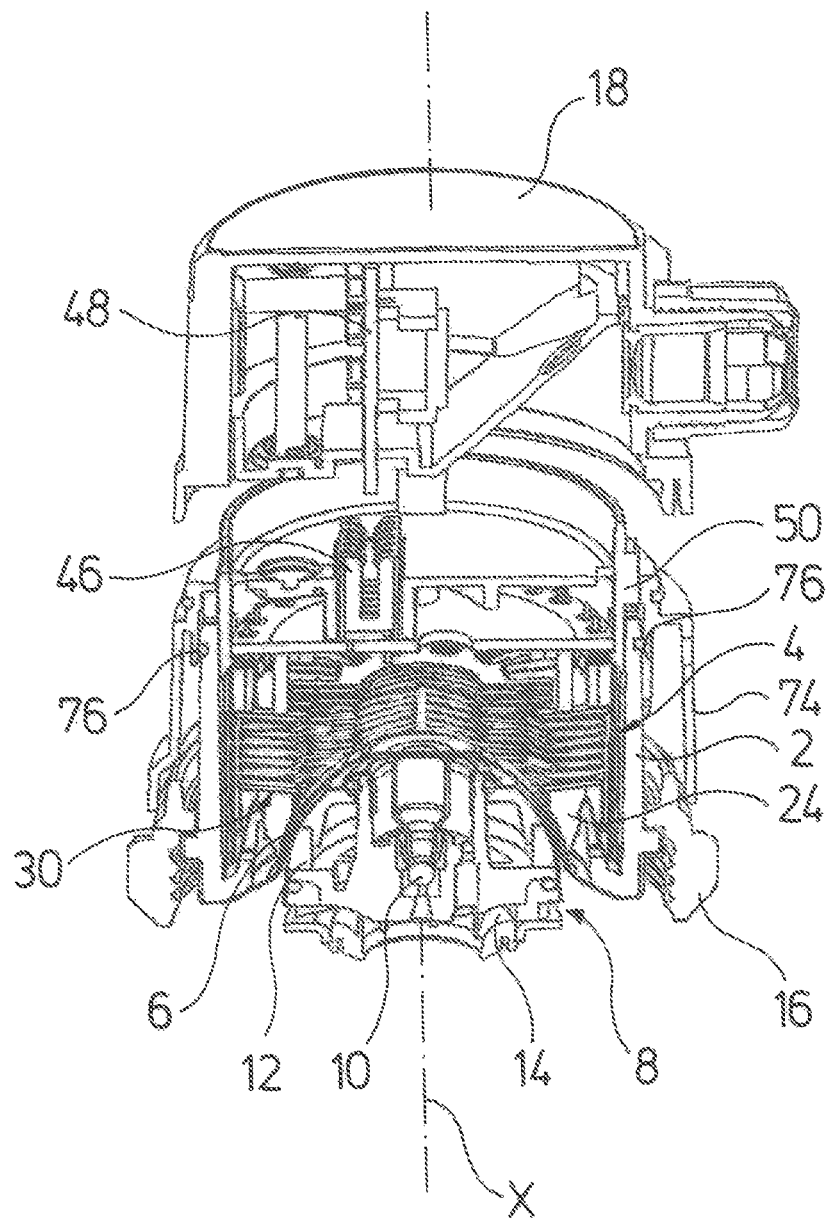
FIG. 1 is a partially exploded, cut view of a wet motor according to an embodiment of the invention used in a pumping set.
Figure 5:
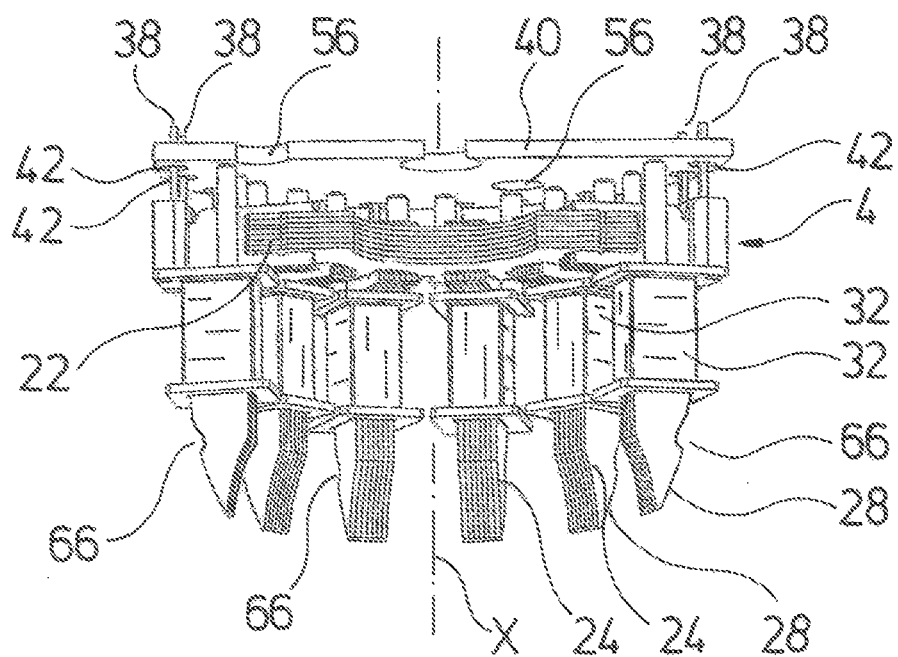
FIG. 5 is a sectional view of the stator.
Figure 6:
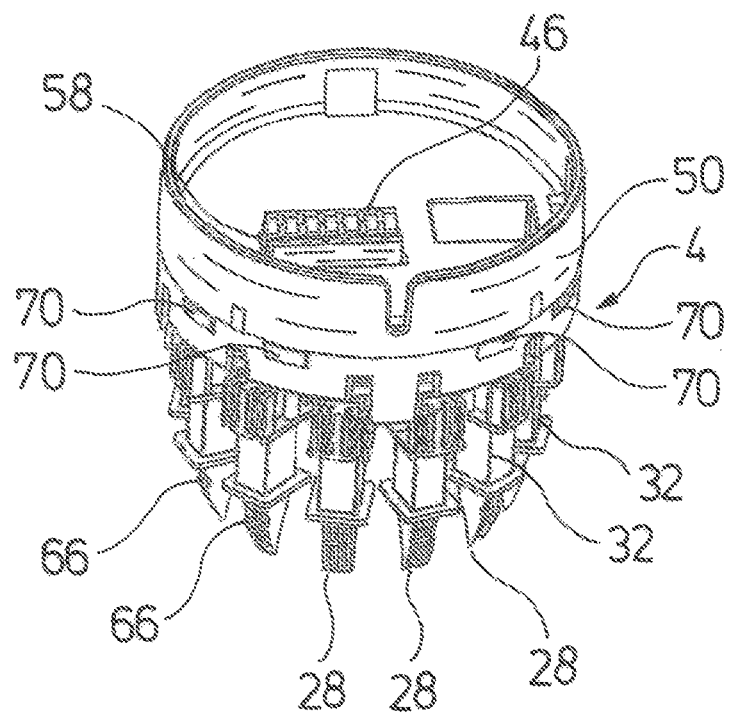
FIG. 6 is a perspective view of the stator according to FIG. 5 with the cover assembled.

The example described here presents a wet electric motor according to an embodiment of the invention as the drive for an industrial water recirculation pump. FIG. 1 shows an overall view. The motor includes a stator casing 2, which incorporates a stator 4. The stator 4 envelops a can 6 in the form of a separating calotte, which at the same time seals an axial end of the stator casing 2. A rotor 8 is situated inside the can 6. The example shown here involves a so-called spherical motor, i.e., the can 6 or separating calotte is bent in a semi-spherical or dome-shaped manner, and the rotor also exhibits a semi-spherical shape. The rotor 8 is mounted on a ball bearing 10, which is supported against the can 6. The spherical shape of the rotor 8 and the can 6 here extend concentrically to the surface of the ball bearing 10. As a result, the rotor 8 can rotate around the longitudinal axis X on the one hand, but also float normal to the latter around the sphere 10 on the other. The rotor 8 is designed as a permanent magnet rotor, and for this purpose exhibits a pole ring 12 in which the permanent magnetic poles are formed.

At its end facing away from the can 6, the rotor 8 has integrally situated therein an impeller 14, which engages into a pump housing (not shown here). The pumping set is joined with the stator casing 2 by way of the retainer nut 16. An electronics housing or terminal box 18 is attached to the axial end of the stator casing 2 facing away from the pump housing or rotor 8.

The stator 4 exhibits an iron part 20, which is formed by a return disk 22 and twelve pole webs 24 secured thereto. Pole webs 24 and the return disk 22 are comprised of laminated iron sheets. The pole webs 24 are inserted into circumferential recesses on the return disk 22 transverse to the latter, so that the pole webs 24 extend from the return disk in an axial direction X toward the can 6. Pole webs 24 are inserted in the recesses 26 on the outer circumference of the return disk 22, and can move around to some extent in these recesses, so that the free ends 28 of the pole webs 24 can move in a radial direction r in relation to the longitudinal axis X. The pole webs 24 here perform a swiveling motion in the recesses 26.

A coil 30 is placed on each of the pole webs 24. The coils 30 are wound onto a respective coil carrier 32 of the kind shown on FIG. 3. The winding is not depicted there. The coil carriers 32 are made out of plastic, and are slipped onto the pole webs 24 from the free end 28, as shown on FIG. 4. A latching nose 34 of the coil carriers 32 here back-grips an abutment shoulder 36 on the pole webs 24. In this way, the coils 30 with the coil carriers 32 are positively fixed in place on the pole webs 24 in the axial direction. The coil carrier 32 has extending from it in an axial direction two respective terminal pins 38, which are joined with the coil winding and serve to electrically connect the latter. The terminal pins 38 are electrically connected by way of a circuit board 40, which is axially placed on the end of the stator 4 opposite the free ends 28, wherein the terminal pins 38 pass through holes 42 in the circuit board 40. The terminal pins 38 are then contacted with conductor paths on the circuit board 40, which is not depicted here, for example via soldering. An electrical plug connection would here be conceivable as an alternative. At the same axial end, pin-shaped contact elements 44 extend parallel to the terminal pins 38 from the coil carriers 32. The axial extension of the contact elements 44 is here shorter than that of the terminal pins 38. The circuit board 40 comes to lie on the front ends of the contact elements 44, thereby preventing force from being conveyed via the terminal pins 38 to the circuit board 40 when exposed to pressure. The latter rather abuts directly against the coil carriers 32 via the contact elements 44.

In addition to the conductor paths for electrically contacting the coils 30, the circuit board 40 carries electrical and electronic components of a motor controller, for example a frequency inverter. Arranged on the side of the circuit board 40 facing away from the iron part 20 of the stator 4 is a terminal plug 46, which serves to electrically connect the electronic components on the circuit board 40.

In particular, the terminal plug 46 is used for connection with electrical or electronic components in the terminal box 18. In this exemplary embodiment, the circuit board 48 situated in the terminal box 18 has a front edge with electrical contacts that engages into the terminal plug 46 for this purpose.

The face of the stator casing facing away from the pump housing is sealed by a cover 50. For assembly purposes, this cover 50 is placed on the stator 4 before the stator 4 is inserted into the stator casing 2. The cover 50 is here fixed in place on the circuit board 40 with latching elements 52, as shown on FIG. 9. The latching elements 52 are designed as latching hooks, and envelop the circumferential edges of the circuit board 40. The cover 50 additionally exhibits projections 54 that extend into the interior of the stator casing 2. The projections 54 in conjunction with the cover 50 are preferably fabricated as a single piece out of plastic, for example in an injection molding process. The projections 54 extend through the holes 56 in the circuit board 40, and their faces abut directly against the return disk 22. In this way, the cover 50 is supported directly on the iron parts 20, specifically the return disk 22 of the stator 4. The advantage to this is that, when the stator 4 is gripped on the cover 50 and placed into the stator casing 4, any pressure exerted on the cover 50 is thus directly transferred to the iron part 20 of the stator, without the board 40 being situated in the flux. The terminal plug 46 extends outwardly through an opening 58 in the cover 50.

FIG. 7 shows a perspective view of the stator casing 2. The latter is tubular, made out of plastic, and sealed at one axial end by the can 6. For this purpose, the can 6 exhibits a radially outwardly extending collar 60, which is crimped around the axial end of the tubular stator casing 2. In its interior, the stator casing 2 exhibits first pressure elements in the form of resilient tongues that envelop the can 6. These first pressure elements 62 resembling resilient tongues here extend from the end of the stator casing 2 adjacent to the can 6 into the interior of the stator casing 2. The resilient tongues are here bent radially inward. At their free ends, the first pressure elements 62 carry radially inwardly directed latching projections 64. When the stator 4 is placed into the stator casing 2 from the open axial end facing away from the can 6, the latching projections 64 of the first pressure elements 62 come to abut against the exterior sides of the free ends 28 of the pole webs 24. A first pressure element 62 is here designed for each pole web 24 at the corresponding position inside the stator casing 2. The first pressure elements 62 are here dimensioned in such a way that the inner diameter between the radial interiors of the latching projections 64 is smaller at rest than the outer diameter between the radial exteriors of the pole webs 24. The pole webs 24 press the first pressure elements 62 radially outward by a certain degree during insertion, so that the resilient springs of the first pressure elements 62 generate a radially directed restoring force, which themselves press the free ends 28 of the pole webs 24 radially inward until they come to abut against the outside of the can 6. To this end, the interior surfaces of the free ends 28 of the pole webs 24 are bent correspondingly to the dome-shaped can 6. In this position, the latching projections 64 then engage into latching recesses 66 on the outside of the pole webs 24. This fixes the iron part 20 inside the stator casing 2 in an axial direction X. The mobility of the pole webs 24 on the return disk 22 described above allows them to be kept abutted against the outside of the can 6 by the first pressure elements 62. This enables a fixation without play, which prevents rattling noises. In addition, the pole webs 22 are brought into direct contact with the can 6, thereby minimizing the distance to the pole ring 12 of the rotor 8, so as to optimize the magnetic efficiency.

Also accommodated inside the stator casing 2 are two pressure elements 68 in the form of webs extending parallel to the longitudinal axis X, which project radially inward from the inner circumferential surface of the stator casing 2. As shown on FIG. 8, these web-shaped second pressure elements 68 abut against the radial outer surfaces of the coil carriers 32. This presses the coil carriers 32 radially inward on the radial outer surfaces of the pole webs 24, so that the coil carriers 32 also abut against the pole webs 24 without play, and no rattling noises can arise in this area either.

The outer circumference of the cover 50 also exhibits latching elements in the form of latching projections 70. The latter extend radially outward from the outer circumference of the cover. They latch with recesses 72 on the inner circumference of the stator casing 2 when the stator 4 has been placed into the stator casing 2. In this way, the stator 4 is fixed in place inside the stator casing 2 by the first pressure elements 62 and their latching projections 64 on the one hand, and by the cover 50 via the latching projections 70 and recesses 72 on the other. Assembly is accomplished very easily through snapping together and latching. Since the projections 54 lie radially further inward than the latching projections 70, the cover 50 can provide a certain resiliency between the latching projections 70 and projections 54. The latter is also used to fix the iron part 20 of the stator in place inside the stator casing 2 in an axial direction, and also to press it against the can 6 in an axial direction, so that no rattling noises can arise here.

As evident from FIG. 1, the stator casing 2 exhibits a cladding element 74, which envelops the stator casing 2 spaced apart around the circumference. This cladding element 74 is preferably made out of plastic, and fixed in place on the outside of the stator casing 2 in an axial direction by way of a latching connection 76. In other words, the cladding element 76 can also be fixed in place on the stator casing 2 from the end facing away from the pump housing simply by being snapped on. The cladding element 76 serves as thermal insulation, and fixes the retainer nut 16 in an axial direction, so that it cannot slide off the stator casing 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A wet electric motor for a pump comprising:
   a stator casing (2);
   a stator (4) arranged in the stator casing (2), the stator (4) including a plurality of pole webs (24) extending axially and parallel to a rotational axis (X) of the electric motor;
   a can;
   a plurality of first resilient pressure elements (62), each of which is designed as an individual resilient tongue having an attached end integrally formed with the stator casing and an opposing free end, the resilient tongues being circumferentially spaced apart from one another and arranged inside the stator casing (2) in such a way as to exert a radially directed compressive force on the pole webs (24) in the direction of the can (6), wherein the free end of each of the plurality of resilient tongues contacts a radially outwardly facing surface of a respective pole web (24); and
   a plurality of latching projections configured to engage with corresponding latching recesses, the free end of each of the plurality of resilient tongues including one of the latching projections or the latching recesses and the radially outwardly facing surface of each corresponding pole web including the corresponding latching recess or latching projection,
   each of the latching projections extending radially into and contacting the corresponding latching recess in a radial direction.

2. The wet electric motor according to claim 1, wherein the pole webs (24) are movable in at least a radial direction (r).

3. The wet electric motor according to claim 1, wherein a respective electrical coil (30) is placed on each of the pole webs, wherein the coils (30) each include a coil carrier (32), which is non-positively and/or positively joined with the pole web (24).

4. The wet electric motor according to claim 3, wherein the stator casing (2) incorporates second resilient pressure elements (68), against which respective radial exterior sides of the coils (30) or their coil carriers (32) abut.

5. The wet electric motor according to claim 4, wherein the second resilient pressure elements (68) are designed as webs that project radially inward and extend axially along the inner wall of the stator casing (2).

6. The wet electric motor according to claim 4, wherein the stator (4) exhibits a circuit board (40), which electrically contacts the coils (30) of the stator (4), and carries electronic components that comprise engine electronics.

7. The wet electric motor according to claim 6 wherein the circuit board (40) abuts against contact elements (44), which are formed on the coil carriers (32).

8. The wet electric motor according to claim 6, wherein the stator casing (2) is sealed with a cover (50), which is non-positively and/or positively connected with the circuit board (40), wherein the cover (50) includes a passage (58) for an electrical connection element (46).

9. The wet electric motor according to claim 8, wherein the cover (50) is joined with the circuit board (40) and with the stator casing (2) via latching elements (52, 70).

10. The wet electric motor according to claim 8, wherein the cover (50) includes at least one axially extending projection (54), which reaches through a recess (56) in the circuit board (40) and abuts against an iron part (20) of the stator (4).

11. The wet electric motor according to claim 1, wherein the stator casing (2) is enveloped by a cladding element (74), which is joined with the stator casing (2) by latching elements (76).

12. The wet electric motor according to claim 6, wherein the circuit board (40) abuts against contact elements (44), which are formed on the coil carriers (32).

13. A pumping set comprising a wet electric motor according to claim 1.

14. A wet electric motor for a pump comprising:
   a stator casing (2);
   a stator (4) arranged in the stator casing (2), the stator (4) including a plurality of pole webs (24) extending axially and parallel to a rotational axis (X) of the electric motor, the pole webs being attached to the stator such that a free end of each of the pole webs is movable in a radial direction;
   a can;
   a plurality of first resilient pressure elements (62), each of which is designed as an individual resilient tongue having an attached end integrally formed with the stator casing and an opposing free end, the resilient tongues being circumferentially spaced apart from one another and arranged inside the stator casing (2) in such a way as to exert a radially directed compressive force on the pole webs (24) in the direction of the can (6), wherein the free end of each of the plurality of resilient tongues contacts a radially outwardly facing surface of a respective pole web (24); and
   a plurality of latching projections configured to engage with corresponding latching recesses, the free end of each of the plurality of resilient tongues including one of the latching projections or the latching recesses and the radially outwardly facing surface of each corresponding pole web including the corresponding latching recess or latching projection, each of the latching projections extending radially into and contacting the corresponding latching recess in a radial direction.

\* \* \* \* \*